United States Patent [19]

Leo et al.

[11] Patent Number: 4,999,834
[45] Date of Patent: Mar. 12, 1991

[54] COMMUNICATION METHOD AND APPARATUS

[75] Inventors: Robert P. Leo, Charlotte; Mark W. McColgan, Concord; James E. Stockman, III; Jeffrey H. Young, both of Charlotte, all of N.C.

[73] Assignee: International Business Machines Corporation, Armonk, N.Y.

[21] Appl. No.: 326,136

[22] Filed: Mar. 20, 1989

[51] Int. Cl.$^5$ .............................................. H04J 3/26
[52] U.S. Cl. ..................................... 370/94.1; 371/32
[58] Field of Search ................... 370/17, 94.1; 371/32, 371/33

[56] References Cited

U.S. PATENT DOCUMENTS

| | | | |
|---|---|---|---|
| 4,422,171 | 12/1983 | Wortley et al. | 371/32 |
| 4,439,859 | 3/1984 | Donnan | 371/32 |
| 4,601,035 | 7/1986 | Marzec et al. | 371/32 |
| 4,712,214 | 12/1987 | Meltzer et al. | 371/32 |
| 4,750,176 | 6/1988 | Von Veldhuizen | 371/32 |
| 4,862,461 | 8/1989 | Blaner | 371/33 |

OTHER PUBLICATIONS

Data Communications Concepts . . . IBM GC21-51-69-6.

Primary Examiner—Douglas W. Olms
Assistant Examiner—Melvin Marcelo
Attorney, Agent, or Firm—Kenneth A. Seaman

[57] ABSTRACT

A method of communicating between a primary station and a secondary station wherein variable sized packets of information are transferred asynchronously (or in start/stop mode) between the primary station and the secondary station. A communication control (e.g., "BREAK" in the preferred embodiment) indicates the end of each packet. To permit the high speed transfer of data, the secondary station receives a high-speed clocking signal externally, from the primary in the preferred embodiment. The primary station generates and transmits a sequence number in connection with each packet, and the secondary responds to each packet with a status, but without generating a sequence number of its own or transmitting a sequence number. The primary station responds to the lack of a response from the secondary station by resending a transmission, while the secondary station responds to a duplicate transmission by ignoring the second transmission, and responds by resending the status from the previous transmission (which may not be the current status). This method using a minimum of overhead insures that the secondary station only proceeds after it has successfully transmitted its last status to the primary, thus guaranteeing that dynamically changing status will not be lost.

8 Claims, 2 Drawing Sheets

COMMUNICATION METHOD AND APPARATUS

BACKGROUND OF THE INVENTION

1. Field of the Invention

The present invention relates to a method of communicating between two stations operable at high data transfer rates with low system overhead, and the apparatus used in accomplishing the communication of the present invention.

2. Background Art

Various techniques for transferring data between two stations have been proposed. One involves synchronous communication, that is, where the transmitting and receiving stations keep in "lock-step" with each other for each bit of information within the entire packet being transferred. Synchronous communication requires the transmitting station to have all the data for the packet ready before transmission begins, and places a stringent real-time constraint for the continuous transmission of the entire packet. Data link control is employed to manage the communication between two or more stations, sending additional information for such things as station selection and indicating the beginning of a packet, or the end of a packet. Some examples of synchronous communication are binary synchronous communication (BSC), synchronous data link control (SDLC), and high-level data link control (HDLC).

Another technique for transmitting data involves the use of asynchronous, or start-stop communication. In asynchronous communication, synchronization is only maintained for the duration of transfer of each character or byte within the packet being transferred. Additional bits, start-stop bits, must be sent with each character to establish synchronization. Varying time intervals may pass between the transfer of each character in the packet. By its very nature, asynchronous communication is usually considered low speed and inefficient and therefore not conducive to high rates of data transfer. Asynchronous communication has the advantage of requiring a low amount of overhead to implement.

Accordingly, prior art communication systems have significant disadvantages and limitations.

In the transfer of image data from a central processor or computer to a printer or other output device, it is desirable to have the high rates of data transfer associated with the synchronous transfer techniques while maintaining continuity of communication and necessary status. It is also desirable to have the low overhead and the convenience of varying transfer intervals of the asynchronous techniques.

Data communication techniques and practices for prior art systems are detailed in a publication "Data Communications Concepts", published by IBM at various times between 1977 and 1987, one version of which is identified as publication GC21-5169-6. This publication is expressly incorporated herein by reference as teaching some of the fundamentals and vocabulary of data communication, and familiarity with this publication is assumed in understanding the teachings of the present invention.

SUMMARY OF THE INVENTION

The present invention overcomes the foregoing limitations and disadvantages of the prior art communication systems by providing a high data rate asynchronous communication system while maintaining continuity of communication along with necessary status and data link control.

The primary station (which, in the preferred embodiment is a main processor) sends a packet of data with a sequence number while the secondary station (which, in the preferred embodiment is a printer) tracks the sequence number and responds with an error status if the number is incorrect. The secondary station does not itself generate or transmit sequence numbers. If the secondary senses a transmission error, it does not make a response, so that when the primary station does not receive a response from the secondary station, it assumes that there was a transmission error and retransmits the packet. If the secondary station receives the previous sequence number again, it responds with the status associated with the previous sequence number (which may not be the same as the current status). In this case, the received packet is discarded by the secondary station, after the status is transmitted.

To facilitate high data transfer rates of information between the primary and secondary stations, the primary station provides a high speed data clock to be used for transmitting and receiving by all stations. The asynchronous communication control "BREAK" is used in the preferred embodiment to indicate the end of a packet of information, so that the packets need not be of a standard size or transmitted in a synchronous or lock-step communication mode.

Other objects and advantages of the present invention will be apparent to those skilled in the communication art in view of the following detailed description of the invention and the accompanying drawings.

BEST MODE FOR CARRYING OUT THE PRESENT INVENTION

Figure 1:
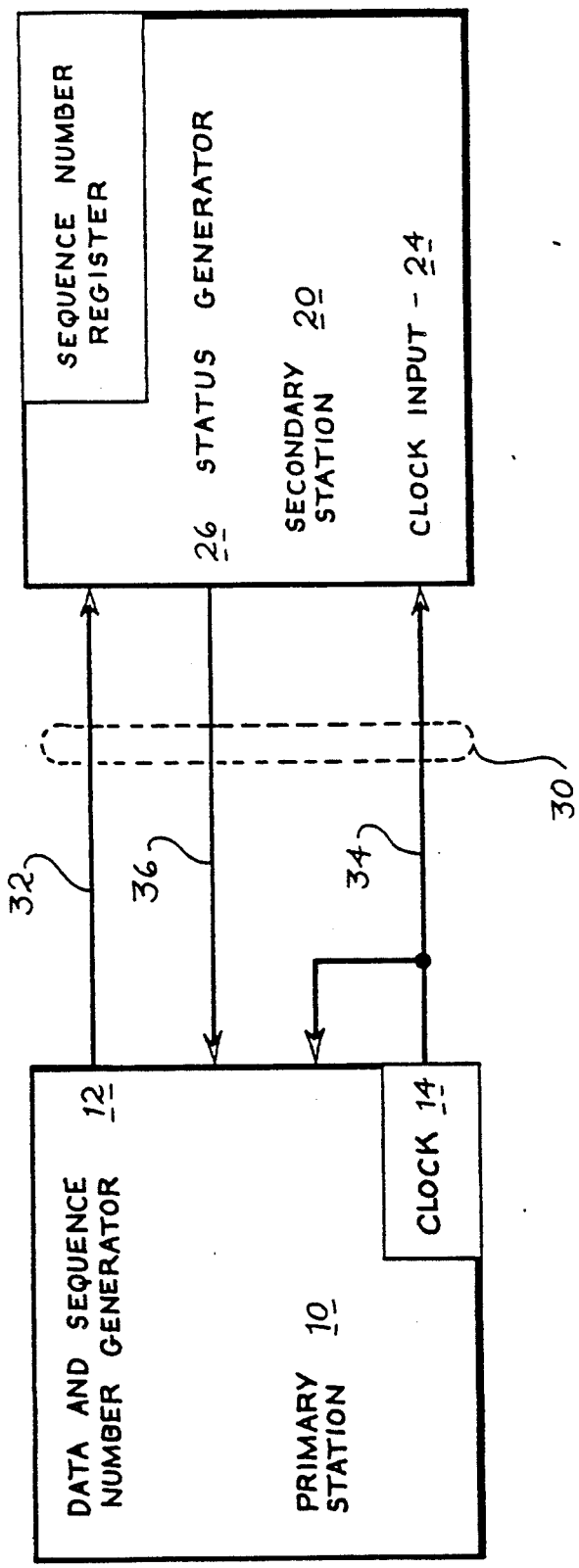
FIG. 1 illustrates the environment of the communication method of the present invention.

As shown in FIG. 1, the communication method of the present invention uses a primary station 10 which communicates with a secondary station 20 over a coupling bus 30.

The primary station 10 is preferably a data source or generator, such as a processor, including a personal computer, which in the preferred embodiment, transmits data representative of an all points addressable, high-resolution image to a secondary station, such as an all points addressable printer. In the context of the present invention, high resolution would include a 240 pel image, that is, one in which in each orthogonal direction, each inch is divided into 240 pels or pixels or picture elements, each of which is separately addressable and which can be either black or white. This resolution requires massive amounts of information to be transferred between the primary station and the secondary station even when the secondary station is producing a nominally low number of pages per minute, and grows substantially more important as either the resolution increases or the rate of printing increases.

The primary station 10 includes a source 12 of data, or in the preferred embodiment, image data and/or controls, which are transmitted over bus line(s) 32, after a sequence number and error checking key are appended. The data transmitted as a single packet in the preferred embodiment, is a packet of 4080 bytes of image, which equals 16 lines of data sent at 240 pels to fill an 8.5 inch line, plus 4 bytes of overhead or control information such as sequence number, and error checking key, also plus the "BREAK" signal or control which signals the end of the transmission. When the packet consists of a command, only 4 bytes are used in the preferred embodiment, and the status response from the secondary station 20 is 4 bytes, in the preferred embodiment, although other sizes of data, controls and responses can obviously be chosen and used to advantage in certain circumstances.

The primary station 10 includes a clock 14 which operates at a high speed, 833,333 (sometimes alternatively expressed as 833 K) bits per second in its preferred embodiment. This clock is coupled over the bus line(s) 34 to provide a clocking source 24 for the secondary station 20. In this manner, the secondary station 20 has an external clocking arrangement in which the clock of the primary station 10 and the effective clock of the secondary station 20 are in common.

The secondary station 20 includes a status generator 26, which transmits status back to the primary station 10 over the bus line(s) 36 in response to the receipt of a packet from the primary station 10.

The secondary station 20 also includes a sequence number register 28, which is used for tracking and verifying the sequence number provided by the primary station 10 with each packet, as will be described in greater detail later.

Figure 2:
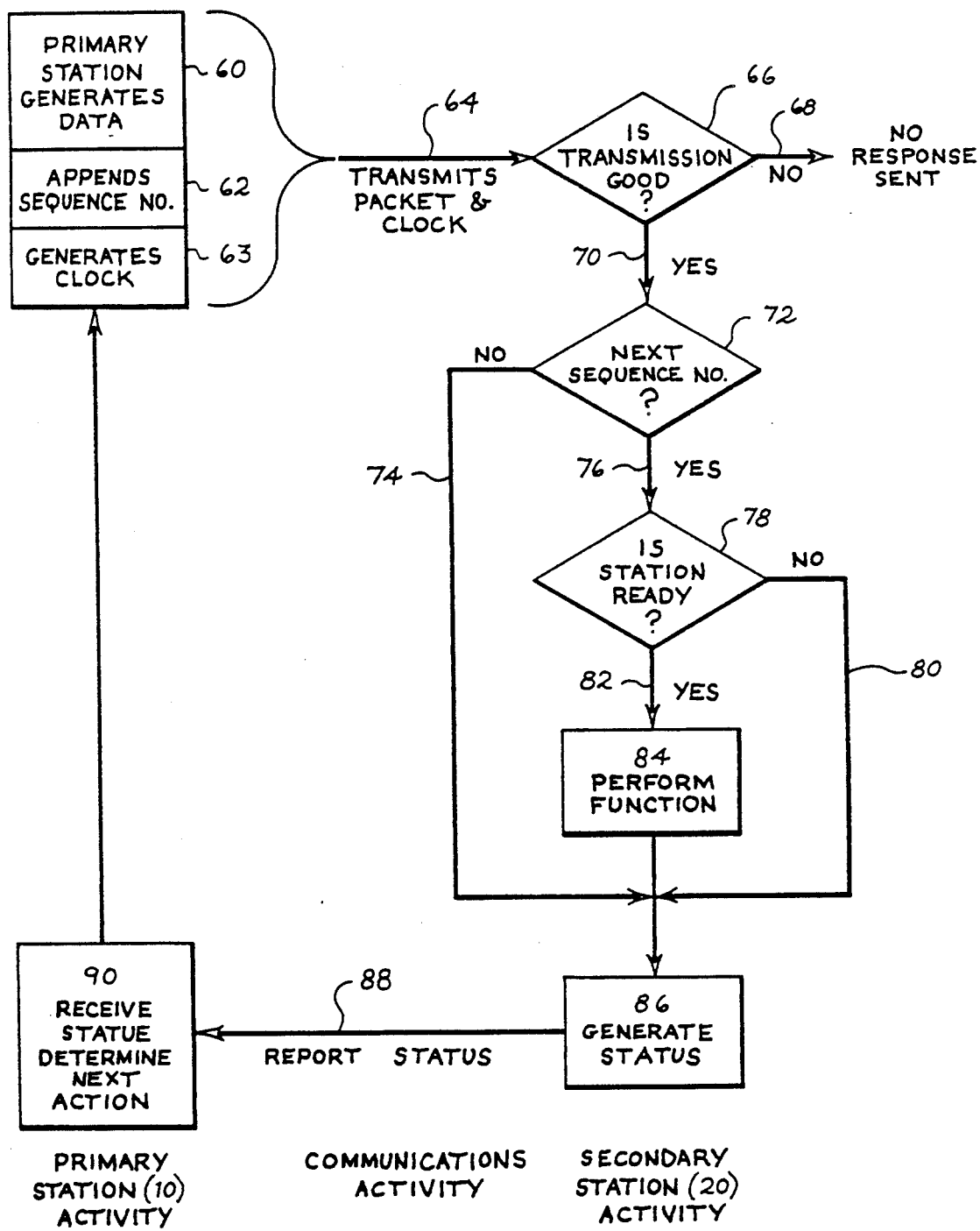
FIG. 2 illustrates the communication flow of the present invention.

As shown in FIG. 2, the activity and logic occurring in the primary station 10 and the secondary station 20 and the communication between the two in the preferred embodiment of the present invention are depicted. In this example, the primary station 10 generates, as the first step of the communication process, a piece of data or information (or control signal) which it desires to send to the secondary station. This information might be an image or an all-points addressable mapping of data points. The secondary station (a printer in the preferred embodiment) is to place the data on a piece of paper in a desired orientation and position in accordance with a prearranged pattern established for communication between the primary station and the secondary station (for example, the printing will occur from left to right on the paper and from top to bottom, and each line will be 8.5 inches wide, and each pel will be 1/240 of an inch).

Once the primary station 10 has generated that image data at block 60, a sequence number is appended at block 62. The sequence number is a sequential number assigned to each packet or block of image data as it is assembled at the primary station 10 for transmission to the secondary station 20. If the packets are sequentially numbered (the first is packet 1, the second is packet 2, and the tenth is packet 10), then the secondary station 20 can follow the sequence numbers, and if it has already received and processed packet 9, it can expect packet 10 next. Then, if it receives packet 11, it knows that a mistake has occurred (and issues a sequence number error message). If packet 10 is received, that is the correct packet and is to be processed. If packet number 9 is received again, it knows that there has been some failure in communication (perhaps its last status was not properly received by the primary station 10, but no further processing is needed, only a resending of the previous status which was sent in response to the first receipt of packet 9). (Of course, there is a provision to reset the sequence number to 0 which, in the preferred embodiment, uses the "CLEAR" command, by which the primary station and the secondary station agree that the present sequence number is 0, and the next sequence number should be 1.)

At block 66, the secondary station 20 first decides whether the packet was received without error. If the transmission was not good, as evidenced by a failure in the comparison of the error checking key (a technique which is well known in the art), indicating that some data was lost or garbled in the transmission, then the exit 68 is used, calling for no action and no response. Then, when a response has not been received by the primary station 10 in a predetermined period chosen to be the time period in which a response would normally be expected (perhaps 50 milliseconds in the preferred embodiment), then the primary station would assume that the transmission had failed (regardless of the direction of the failed transmission when an error occurs) and resend the previous transmission with the previous sequence number appended to it.

If the transmission was good, then the processing at the secondary station proceeds along line 70 to block 72 where the sequence number is verified. The sequence number appended to the current packet ideally would be the next sequence number, which indicates that the packet is a proper packet and the communication is occurring normally. If the sequence number is the same as the last sequence number, then the previous packet is being repeated because the primary station did not get back the proper response (lost or garbled) to the previous packet, and in this case the secondary station merely ignores the repeated packet insofar as the data or control is concerned and retransmits the previous status. Both the next sequence number and the previous sequence number are proper sequence numbers. The next sequence number will allow processing to continue along line 76 to block 78 where it is determined whether the secondary station is ready. The previous sequence number will follow line 74 to block 86, where status generation will retransmit the previous status. Any other sequence number at the block 72 is erroneous. If the sequence number is in error (except for the "CLEAR" which reset the sequence number), a "sequence number error" is generated, and control passes along line 74.

From block 78, if the secondary station is not ready, control passes along line 80 where the status indicating that the station is not ready is generated; otherwise, control passes along line 82 to block 84 where the function requested is performed. This function may, depending on the data, be to print a piece of data or a particular pel pattern on a page or a portion, or the packet may call for some other function to be performed, such as ejecting a piece of paper or advancing the paper or sounding a bell.

Once the function is performed, or if there has been an incorrect sequence number discovered at block 72 or the secondary station is not ready from block 78, then a status of the secondary station is generated at block 86 and transmitted to the primary station (without a sequence number) as is indicated by line BB. Then, at block 90, the primary station 10 decides what to do next. For example, if the printer or secondary station 20 has responded with a "BUSY" status, then the primary station 10 resends the same information packet with a new sequence number. If there was a printer fault (e.g., out of paper), then a status received by the primary station (e.g., intervention required on secondary) can be displayed. Alternatively, if the status is secondary station or printer "ready", then the next packet of information can be generated and the communication steps beginning with block 60 can be initiated again to repeat the cycle.

Of course, many modifications and alterations of the preferred embodiment are possible without departing from the spirit of the present invention. It is also possible to use some of the features of the present invention without the corresponding use of other features. For example, the present invention has been described in the context of a single primary station coupled to and driving a single secondary station. In fact, either or both the primary station and the secondary stations could exist in a multiple station environment, such as a network, where there are multiple generators of data and multiple recipients of data, and each has an address. In that case, the principles of the invention remain largely unchanged, except that the packets must include an address for the device. That is, a packet from a primary station must include which printer or secondary station the packet is intended where multiple secondaries exist, and where the secondary station is addressing one primary station of several, it must identify which primary station it is addressing, or otherwise indicate the primary station. These identifications of stations are conventional and well known in the prior art, and applicable to the present invention. Accordingly, the foregoing illustration of the present invention should be understood to be merely illustrative of the principles of the invention, and not in limitation of the scope of the invention, which is governed solely by the claims which follow.

Having thus described the invention, what we claim as our invention is:

1. A method of communicating between a primary station and a secondary station comprising the steps of:
    generating a high-speed clock signal at the primary station;
    generating at the primary station for transmission to the secondary station a data packet, a sequence number associated with the data packet and a first error checking key based on the sequence number and data packet and assembling the data packet, the sequence number and the first error checking key into an information packet;
    transmitting the information packet and the high-speed clock signal from the primary station to the secondary station so that the same clock signal is used by the primary and secondary stations for both transmitting and receiving the information packet;
    transmitting a packet-termination signal from the primary station to the secondary station to indicate the end of the information packet;
    using the high-speed clock from the primary station to control the receiving of the information and control signals at the secondary station;
    recognizing at the secondary station the signal indicating the end of a transmission packet;
    generating a secondary error checking key for the received information packet by the secondary station and comparing the secondary error checking key with the error checking key received by the secondary station from the primary station with the information packet;
    discarding the information if any transmission errors were detected as evidenced by the failure of the keys to match;
    comparing the sequence number received with a generated expected sequence number;
    generating status data at the secondary station for transmission in response to the information packet from the primary station, the status data reflecting success or failure in receipt of the information packet from the primary and a status report of the secondary station, but without a sequence number being applied to the communication from the secondary station to the primary station.

2. A communication method including the steps described in claim 1 wherein the step of generating the status data further includes reporting the comparing of the sequence number received by the secondary station with the expected sequence number generated by the secondary station.

3. A communication method including the steps described in claim 2 wherein the step of generating the status data further includes the step of comparing the first error checking key received by the secondary with the expected error checking key generated by the secondary station and in not responding for a predetermined period when the comparing indicates a transmission failure.

4. A primary generator station for generating large amounts of data to be sent to a secondary station for processing, the primary station comprising:
    means associated with the primary generator station for producing the data to be sent to the secondary station;
    means coupled to the primary station for generating a periodic high-speed clock for use in the primary station and for transmission to the secondary station to serve the secondary station as an external clock operating at the same rate as the clock for the primary station;
    means for generating a sequential sequence number and an error checking key and means for assembling and transmitting to the secondary station the data, the sequential sequence number and the error checking data; and
    means for receiving and processing a status report from the secondary station indicating receipt of the data, the sequence number and the error checking key.

5. A secondary station adapted to receive and process large amounts of data from a primary station at high speed and over a short period of time, the secondary station comprising:
    means for receiving asynchronous information packets including a sequence number and error checking key from the primary unit;
    means for receiving an external high-speed clock signal, the clock signal being the same for both transmitting and receiving by the primary and secondary stations;
    means within the secondary station for generating and transmitting to the primary unit a status signal in response to a packet of information from the primary, said status signal being characterized by the absence of a sequence number but including status data and an error checking key;
    means in the secondary station for calculating the sequence number expected from the primary station and for comparing the received sequence number from the primary station to the expected sequence number; and means in the secondary station for generating and transmitting an error message when the comparison fails between the expected sequence number and the received sequence number.

6. A secondary station of the type described in claim 5 wherein the high-speed clock signal is generated at the primary at a rate in excess of 800 Kilobits per second.

7. A communication method including the steps of claim 1 wherein the method further includes generating at the primary station a control signal as an indication of the end of a packet of information, and recognizing that control signal at the secondary station as an indication of the end of a packet.

8. A communication method including the steps of claim 1 wherein the method further includes making no response from the secondary station in response to a faulty transmission, and generating at the primary station a repeated packet in response to not receiving a responsive message from the secondary within a preset time.

* * * * *